United States Defensive Publication [19] (H) [11] T961,008

Hendy [43] Aug. 2, 1977

[54] ORIENTED POLYOLEFIN FILM TREATED WITH QUATERNARY AMMONIUM SALTS

[75] Inventor: Brian Norman Hendy, Welwyn, England

[73] Assignee: Imperial Chemical Industries Limited, London, England

[21] Appl. No.: 762,157

[22] Filed: Jan. 24, 1977

[30] Foreign Application Priority Data

Feb. 6, 1976 United Kingdom ..... 4767/76

[51] Int. Cl.[2] ..... B05D 1/00; B05D 3/00

[52] U.S. Cl. ..... 427/401; 427/171; 427/384; 428/500; 428/910; 252/8.8

[57] ABSTRACT

Oriented polyolefin, especially polypropylene, films are produced having antistatic properties by applying to the cast extrudate an aqueous solution on at least one surface of the film of a quaternary ammonium salt of the general formula

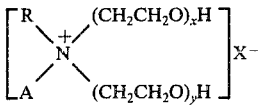

where X is a univalent anion or an equivalent of a multivalent anion, $x$ and $y$ are positive integers the sum of which is from 2 to 5, A is a lower alkyl group, and R is a univalent aliphatic radical containing from 1 to 22 carbon atoms, then the thus coated film is heated and stretched to orient it. Film forming polyolefins such as homo and co-polymers of ethylene, propylene, butene-1 and 4-methylpentene-1 are suitable, preference being given to a high molecular weight stereoregular predominantly crystalline polymer of propylene, either as a homopolymer or copolymerized with up to 15 weight percent of other unsaturated monomers, such as ethylene.

Preferred quaternary ammonium salts of the above formula, especially chlorides, are those in which X plus $y$ is 2, A is methyl and R is a mixture of aliphatic carbon radicals having 8–18 carbon atoms, or 12–18 carbon atoms, particularly those derived from tallow or soya oil, or derived from coconut oil. Examples of commercially available materials include Ethoquad C/12 and O/12 for formed by the addition of methyl chloride to the tertiary amines sold as Ethomeen T/12 and S/12. Use of the corresponding tertiary amine as the hydrochloride salt does not provide the oriented film with antistator properties.

The amount of the quaternary ammonium salt present on the surface of the treated film constitutes from 0.05 to 2.5, preferably 0.1 to 1%, by weight of the coated film. The coating solution may also be supplemented by one or more antistatic agents such as the monoethoxylated quaternary ammonium salt chlorine chloride.

The substrate may also be a multiple-layer substrate having a polypropylene layer and at least one surface layer of a copolymer of propylene with from 5 to 20 by weight of the copolymer of another alpha-olefin containing from 4 to 10 carbon atoms in its molecule.

Films so treated exhibit a surface resistivity not exceeding 10, and preferably less than 0.5, gigohms.

10 Claims, No Sheets Drawing,

12 Pages Specification

The file of this unexamined application may be inspected and copies thereof may be purchased (849 O.G. 1221, Apr. 9, 1968).